US012314517B2

(12) United States Patent
Lomas et al.

(10) Patent No.: US 12,314,517 B2
(45) Date of Patent: May 27, 2025

(54) OPTICAL TOUCH SCREEN

(71) Applicant: Uniphy Limited, Leeds (GB)

(72) Inventors: David Lomas, Swindon (GB); Michael David Bean, Windsor (GB); Iain Macalister, Beverston (GB); Jim Edward Nicholas, Clifton Village (GB)

(73) Assignee: Uniphy Limited, Leeds (GB)

( * ) Notice: Subject to any disclaimer, the term of this patent is extended or adjusted under 35 U.S.C. 154(b) by 0 days.

(21) Appl. No.: 18/269,377

(22) PCT Filed: Dec. 22, 2021

(86) PCT No.: PCT/GB2021/053404
§ 371 (c)(1),
(2) Date: Jun. 23, 2023

(87) PCT Pub. No.: WO2022/136868
PCT Pub. Date: Jun. 30, 2022

(65) Prior Publication Data
US 2024/0069676 A1 Feb. 29, 2024

(30) Foreign Application Priority Data

Dec. 23, 2020 (GB) ..................... 2020523

(51) Int. Cl.
G06F 3/042 (2006.01)
(52) U.S. Cl.
CPC .. G06F 3/0421 (2013.01); G06F 2203/04104 (2013.01)

(58) Field of Classification Search
None
See application file for complete search history.

(56) References Cited

U.S. PATENT DOCUMENTS 8,441,467 B2 * 5/2013 Han ..................... G06F 3/0425
250/221
10,890,332 B2 * 1/2021 Zarcone .............. F21V 33/0044
(Continued)

FOREIGN PATENT DOCUMENTS

ES 2452173 A2 3/2014
GB 2594232 10/2021
(Continued)

Primary Examiner — Lunyi Lao
Assistant Examiner — Sarvesh J Nadkarni
(74) Attorney, Agent, or Firm — Boyle Fredrickson, S.C.

(57) ABSTRACT

A touch sensitive apparatus comprises: a top plate comprising a plurality of touch detection regions, and having one or more light sources associated therewith, such that light from the one or more light sources is transmitted within the top plate with total internal reflection; a plurality of detectors for detecting light from the one or more light sources, wherein each detector is associated with a touch detection region; wherein the top plate and the detectors are arranged such that if an external body touches a first surface of the top plate in a touch detection region, then light is coupled from a second surface of the top plate to the associated detector(s); the touch sensitive apparatus further comprising processing means to determine at least the presence or absence of a touch in any of the touch detection regions of the top plate.

17 Claims, 8 Drawing Sheets

(56) References Cited

U.S. PATENT DOCUMENTS

| | | | |
|---|---|---|---|
| 11,747,920 B2* | 9/2023 | Yokoyama | G06F 3/0346 |
| | | | 345/184 |
| 2009/0128508 A1 | 5/2009 | Sohn et al. | |
| 2013/0048857 A1* | 2/2013 | Hasselbrinck | G06F 3/03547 |
| | | | 250/214 SW |
| 2013/0050149 A1 | 2/2013 | Rattray et al. | |
| 2013/0099009 A1* | 4/2013 | Filson | H04L 67/10 |
| | | | 236/1 C |
| 2015/0035803 A1* | 2/2015 | Wassvik | G06F 3/0412 |
| | | | 345/175 |
| 2016/0252979 A1* | 9/2016 | Yun | G01D 5/58 |
| | | | 345/184 |
| 2016/0328091 A1* | 11/2016 | Wassvik | H01S 5/423 |
| 2016/0334942 A1* | 11/2016 | Wassvik | H01S 5/423 |
| 2017/0350751 A1* | 12/2017 | Tang | H05K 1/181 |
| 2018/0150671 A1* | 5/2018 | Choo | G06F 3/0416 |
| 2019/0339814 A1* | 11/2019 | Lomas | G06F 3/02 |
| 2022/0065704 A1* | 3/2022 | Mitchell | G05D 23/1917 |
| 2023/0035865 A1* | 2/2023 | Lomas | G06F 3/0421 |

FOREIGN PATENT DOCUMENTS

| | | | | |
|---|---|---|---|---|
| WO | 2008017077 A2 | 2/2008 | | |
| WO | WO-2013081672 A1 * | 6/2013 | | G06F 3/0202 |

* cited by examiner

OPTICAL TOUCH SCREEN

FIELD OF THE INVENTION

This invention relates to optical touch screen technology. It is particularly relevant to the construction and operation of touch screens for device control.

BACKGROUND

The provision of touch sensitive screens for device control is becoming increasingly widespread, particularly for handheld electronic devices. Conventional touch screen arrangements may comprise an LCD display surface and a resistive or capacitive overlay that is placed over the LCD display surface. In a resistive touchscreen, when pressure is applied to the LCD display surface, via the overlay, electronic signals representative of the relative location, are generated by a controller IC and a device driver, or similar, in the host computing device interprets such signals as touch-based inputs, such as a key press or scroll action. Similarly, in a capacitive touchscreen, disturbance in the electric field, created in the overlay, is used to determine the touch action(s).

Resistive touch screens are particularly favoured for many applications in view of their low cost, low power consumption and stylus support. Resistive touch screens generally comprise conductive and resistive layers, separated by thin spaces. When a pointer, such as a finger or stylus, touches the screen, contact is made between the layers, thereby effectively closing a switch and causing current to flow. A controller determines the current between layers to derive the position of the touch point.

However, there are a number of disadvantages associated with resistive touch screens. As a result of the overlay, the screens are not fully transparent, and are generally not readable in direct sunlight. Furthermore, such screens are subject to deterioration of the pressure sensitive layers, and also require periodic re-calibration. Further still, sufficient pressure is required to be applied for detection: thus, if insufficient pressure is applied by a pointer, it will go undetected. Moreover, resistive touch screens are unable to discern that two or more pointers are touching the screen simultaneously, a function known as "multi-touch".

Capacitive type touch screens overcome some of the issues associated with resistive touch at a generally higher cost. Such systems work by detecting the capacitance change due to touch, on an embedded array of conductors. This detection can either based on the differential change in capacitance of these conductors (Self-capacitance) or in the differential change in capacitance in pairs (or sets) of these conductors (Mutual-capacitance). Disadvantages with capacitive touch screens include mis-triggering, electromagnetic interference and relatively expensive tooling costs.

One of the most significant disadvantages to both resistive and capacitive technology is their inability to inherently determine the pressure intensity of a touch with any significant dynamic range. This means that it is not easy to distinguish between a light, accidental, touch and a firmer, intended, touch, and the use of touch pressure as an additional control input cannot be inherently realised.

Other types of touch screen technology have been developed. For example, the present applicant has devised an alternative technology described in WO2015/155508 based on frustrated total internal reflection. This addresses a number of the problems of conventional touch screens.

However, touch screens are still generally limited in use to conventional device displays in which a flat glass sheet forms a front user interface surface for a device. It would be desirable to expand the use of touch screen technology so that it could be used effectively and reliably in contexts where this form factor was inconvenient or inappropriate.

It is against this background that the present invention has been devised.

SUMMARY OF THE INVENTION

In a first aspect, the invention provides a touch sensitive apparatus comprising: a top plate comprising a plurality of touch detection regions, and having one or more light sources associated therewith, such that light from the one or more light sources is transmitted within the top plate with total internal reflection; and a plurality of detectors for detecting light from the one or more light sources, wherein each detector is associated with a touch detection region. The top plate and the detectors are arranged such that if an external body touches a first surface of the top plate in a touch detection region, then light is coupled from a second surface of the top plate to the associated detector(s). The touch sensitive apparatus further comprises processing means to determine at least the presence or absence of a touch in any of the touch detection regions of the top plate.

The detectors may be arranged beneath the top plate and may be configured to detect light coupled out of the second surface of the top plate owing to a touch on the first surface of the top plate.

A sensing area of each detector may be directed generally towards the second surface of the top plate. Each detector may be a proximity focused PIN diode.

Each light source may be an infrared light source, and each detector may be an infrared detector.

A sensor window may be disposed between each sensor and the top plate. The sensor window may be substantially translucent to infrared light but substantially opaque to infrared light.

The touch sensitive apparatus may comprise at least one display element associated with a touch detection region. At least one display element may be arranged beneath the top plate. At least one display element may be positioned beneath its associated touch detection region, such that activation of the display element causes information to be displayed in its associated touch detection region. At least one display element may be positioned such that activation of the display element causes information to be displayed in a display region of the top plate that is adjacent to the associated touch detection region of the display element.

The touch sensitive apparatus may comprise one or more projecting regions elevated from the top plate. At least one of the projecting regions may comprise a central region with a circumferential edge region between the central region and a planar region of the top plate.

The central region and the circumferential edge region may each define a plurality of touch detection regions.

The processing means may provide the touch detection regions of the circumferential edge region with the functionality of a dial.

The top plate may not be planar, i.e. may be non-planar.

The detectors and the display elements may be housed together in a first housing unit. The light sources may be housed together in a second housing unit. The second housing unit may be positioned such that the light sources emit light into an edge of the top plate.

The processing means may determine a difference between the intensity of light detected by a first detector and the intensity of light detected by a second detector, and may determine if a touch has occurred in a first touch detection region associated with the first detector or in a second touch detection region associated with the second detector based on the difference.

The processing means may be adapted to detect touches in multiple touch detection regions at the same time.

The touch sensitive apparatus may further comprise a further touch sensitive region, the further touch sensitive region comprising: a portion of the top plate discrete from the plurality of touch sensitive regions, wherein the one or more light sources transmit light within the portion of the top plate with total internal reflection; and an optically dispersive base plate, configured for transmission of light from the portion of the top plate onto and into said base plate in response to an external body touching said portion of the top plate at a touch point such that a location of incident light on the surface of said base plate is representative of a relative position of said touch point on said portion of the top plate, wherein said base plate is configured to capture and transmit within the base plate light incident thereon and disperse said transmitted light by spreading and energy loss, an optically dispersive characteristic of said base plate being such that a decrease in intensity of said transmitted light with distance from said location of incidence on said base plate surface approximates an exponential function, the arrangement further comprising at least one sensor for detecting an intensity of light transmitted out of the base plate at a respective edge of said base plate; wherein the processing means is adapted to calculate a relative position of said touch point on said screen from said detected light intensity and said exponential function.

In another aspect, the invention provides a method of operating a touch sensitive apparatus comprising a top plate comprising a plurality of touch detection regions, and having one or more light sources associated therewith, such that light from the one or more light sources is transmitted within the top plate with total internal reflection, and a plurality of detectors for detecting light from the one or more light sources, wherein each detector is associated with a touch detection region; wherein the touch sensitive apparatus further comprising processing means to determine at least the presence or absence of a touch in any of the touch detection regions of the top plate, the method comprising: determining in which touch detection regions of the touch sensitive apparatus a touch has been detected; and determining a control operation corresponding to the touch detection regions in which a touch has been detected and performing the control operation.

Touches may be detected in multiple touch detection regions and control operations may be performed corresponding to all of the touches.

At least one control operation may relate to multiple touch detection regions with touches detected at the same time.

The touch sensitive apparatus may be comprised in an interface to another apparatus, and the control operations may relate to control of that apparatus.

BRIEF DESCRIPTION OF THE DRAWINGS

In order that the invention may be more readily understood, preferred non-limiting embodiments thereof will now be described, by way of example only, with reference to the accompanying drawings, in which.

Figure 1:
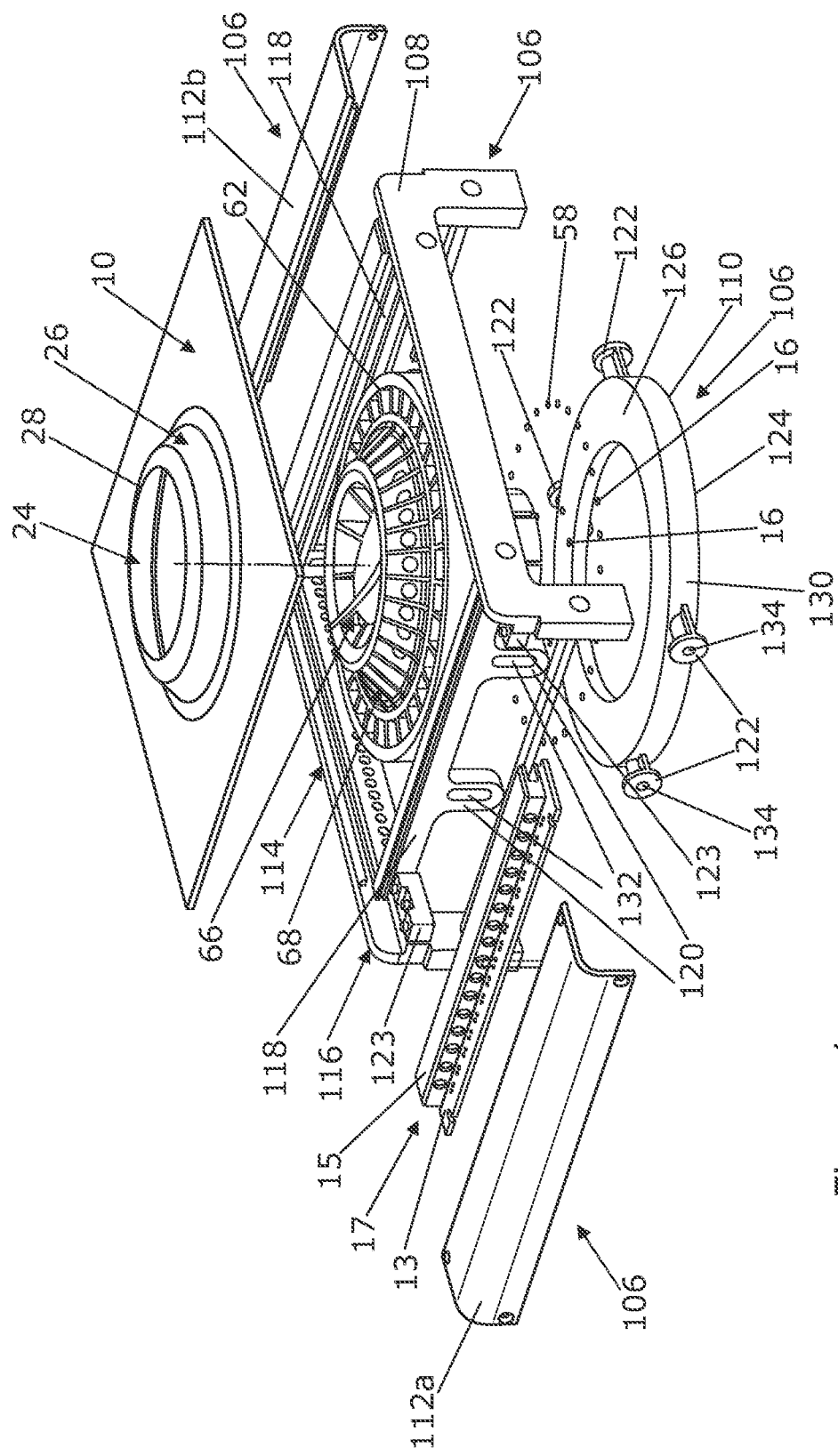
FIG. 1 is an exploded view of a touch screen arrangement in accordance with an embodiment of the invention.
Figure 2:
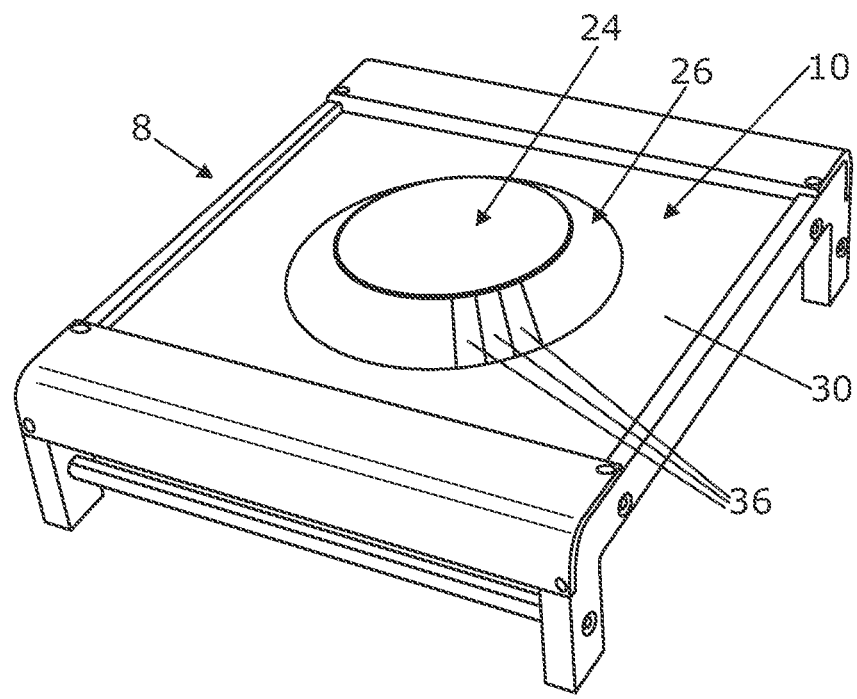
FIG. 2 is a perspective view of the touch screen arrangement of FIG. 1.
Figure 3:
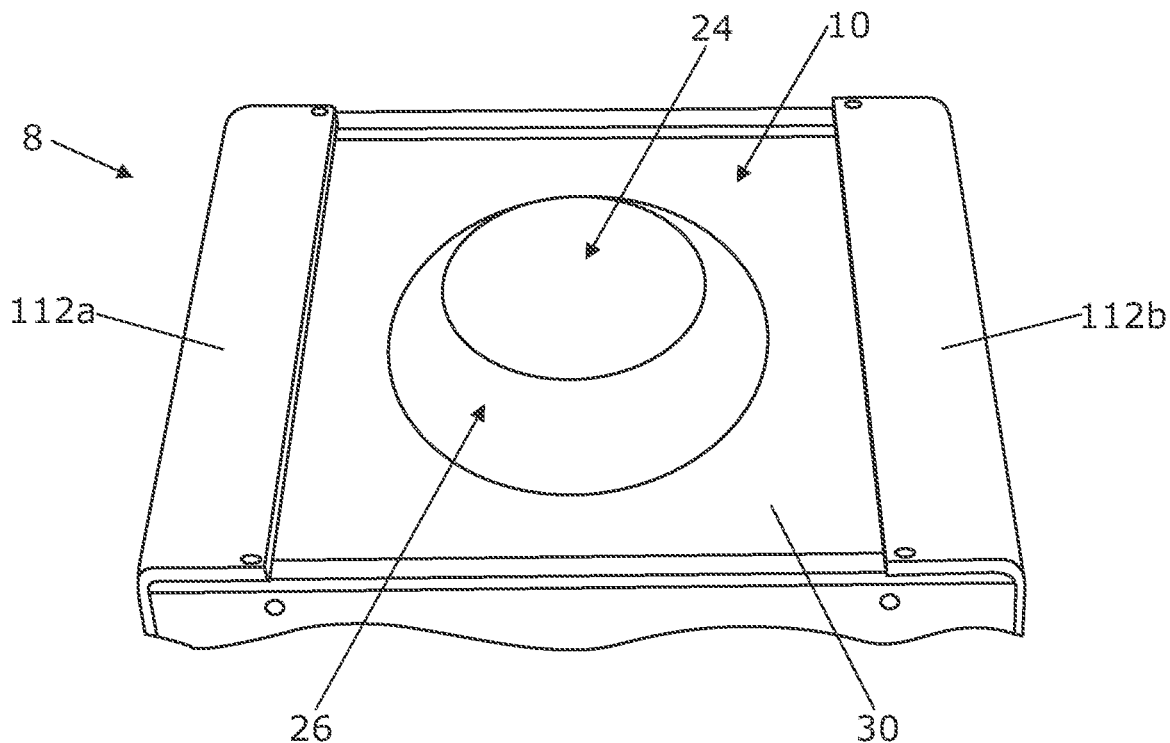
FIG. 3 is another perspective view of the touch screen arrangement of FIG. 1.

In the drawings, as well as in the following description, like features are assigned like reference signs.

SPECIFIC DESCRIPTION

FIGS. 1 to 11 show a touch screen arrangement 8 in accordance with an embodiment of the invention.

With reference to FIG. 1 in particular, the touch screen arrangement 8 comprises an optically transparent top plate 10, a plurality of light sources 12, and a plurality of detectors or sensors 14. Embodiments shown also include a plurality of display elements. In FIG. 1, some of these display elements are shown in the form of display lights 16.

The top plate 10 may be formed of any optically transparent material, e.g. glass or acrylic. The light sources 12 are located at an edge of the top plate 10 and each comprise a light emitting diode (LED) in this example, although it will be apparent to the skilled person that other light sources could be used. The light sources 12 are mounted to a printed circuit board (PCB) 13 and are housed and supported in a holder 15 to form a line of emitters that extend along substantially the full length of an edge of the top plate 10 in use. The light sources 12, holder 15 and PCB 13 and associated electronics form an emitter unit 17 of the touch screen arrangement 8. One or more lenses (not shown) may be provided between the light sources 12 and the edge of the top plate 10, if required, in order to angle, focus and/or laterally spread the illuminating light. The light sources 12 may comprise infrared or visible, intensity modulated light sources, such that the arrangement works effectively in bright ambient conditions. In this case, the ability to accurately detect touch position can be enhanced by uniquely modulating each light source 12, or groups of light sources, using either a spread spectrum based approach or multiple modulation frequencies. Although a plurality of light sources 12 are provided in this example, the skilled person will understand that it would be possible for the arrangement to comprise just a single light source. Also, the skilled person will understand that light sources 12 could be provided along multiple edges of the top plate 10 in other embodiments and that, although the light sources 12 are provided at the edge of the top plate 10 in FIG. 1, light may be injected into the top plate 10 from different positions in other embodiments.

Located below the top plate 10, there is a middle layer 18 having a refractive index which is less than that of the optically transparent plate. In this embodiment the middle layer 18 is comprised of air, but the substance used for the middle layer 18 is only constricted by the requirement that it have a lower refractive index than the material used for the top plate 10.

In the touch screen arrangement 8, the top plate 10 is illuminated by the light sources 12 so as to cause total internal reflection of the light within the top plate 10, between a first or upper surface 20 and a second or lower surface 22 of the top plate 10. Total internal reflection is a phenomenon that occurs when an incident light wave strikes a medium boundary at an angle larger than a particular critical angle with respect to the normal of the surface. If the refractive index is lower on the other side of the boundary and the incident angle is greater than the critical angle, the light cannot pass through the boundary and is entirely reflected within the medium.

If a pointer such as a stylus or finger touches the upper surface 20 of the top plate 10, the total internal reflection within the top plate 10 is interrupted by means of frustrated total internal reflection (FTIR). This causes some light to be transmitted through the top plate 10 and the middle layer 18. It will be appreciated that the location at which the top plate 10 is touched will determine the relative location that the light exits the top plate 10 from its lower surface 22. As will be explained in more detail later, in the event that the touch occurs in a touch sensitive, touch detection region of the top plate, light exiting the top plate 10 from its lower surface 22 is coupled to at least one sensor 14 positioned beneath the top plate 10, and the touch screen arrangement 8 detects that a touch has occurred and can determine in which touch detection region or regions of the top plate 10 the touch occurred. Furthermore, the overall area of the touch and the proportion of 'actual surface contact' between e.g. a user's finger and the top plate 10 during the touch, a smooth surface having a higher proportion of surface contact and a rough surface having a lower proportion of surface contact, hereby referred to as the level of 'actual surface contact', determines the absolute amount of light from the light sources 12 that is emitted from the top plate 10, and is thus related to the absolute amount or intensity of light that is captured by the underlying sensor(s) 14.

The area of 'actual surface contact' between the user's finger and the surface of the top plate 10 is the area where the distance between the user's finger and the top plate 10 is sufficiently small so as to frustrate total internal reflection. In practice, there will be a proportion of the user's finger that generally appears to be in contact with the top plate 10, but is actually not sufficiently close to the surface of the top plate 10 due to, for example, differences in surface roughness across the top plate 10 and/or the user's finger.

A larger apparent or nominal area of contact between a user's finger and the top plate 10 generally results in a larger area of actual surface contact. Furthermore, a greater intensity or pressure of touch (i.e. a harder press) generally results in a larger area of actual surface contact. This is because a harder press will tend to cause the finger to spread, thereby increasing the nominal area of contact between the finger and the top plate 10, as well as pushing a greater proportion of the finger within the nominal area of contact into actual contact with the top plate 10, and increasing the "wetting out" of the interface between the finger and the top plate 10.

The absolute light intensity detected by the sensor(s) 14 for a given touch position is therefore indicative of the area of actual surface contact between the user's finger and the top plate 10, which is in turn indicative of the touch intensity or pressure, and/or the nominal extent of the touch in the touch detection region.

In this example, the top plate 10 is contoured and has a curved profile. Specifically, the top plate 10 has a top face 24 that defines a central region and a side face 26 that defines a circumferential edge region. The top face 24 is generally circular in plan view and the side face 26 extends downwardly and radially outwardly from a circumferential edge 28 of the top face 24 to a surrounding portion 30 of the top plate 10, which in this case is a planar region. The shape of the top plate 10 is not limited to this specific shape, and could be any number of other shapes in other embodiments.

Figure 6:
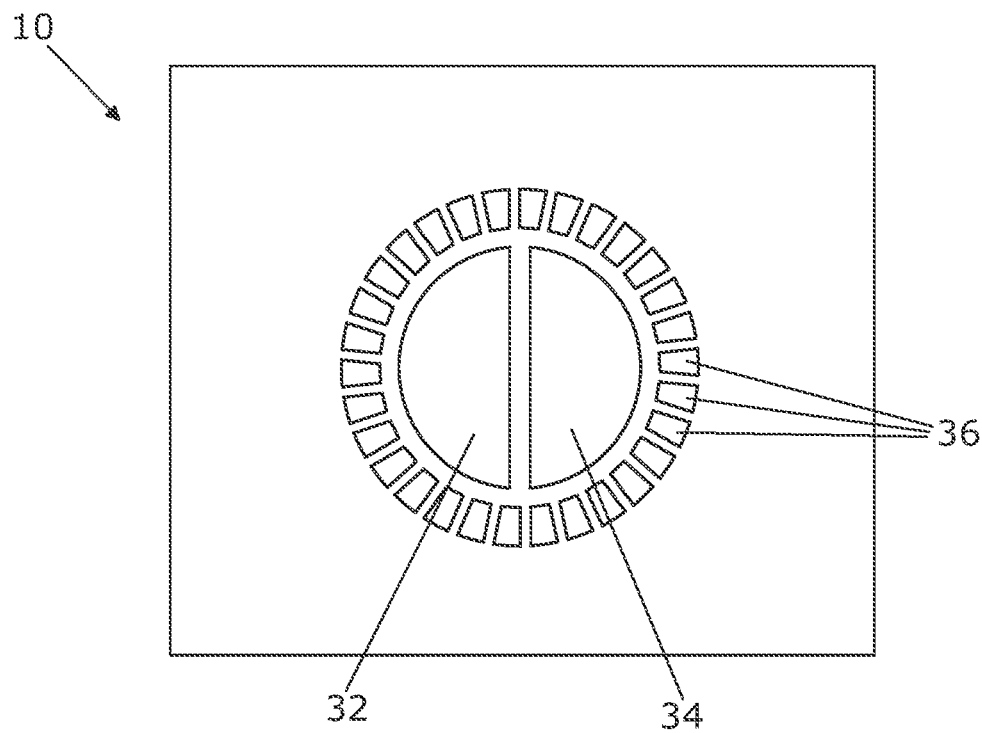
FIG. 6 is a plan view of a top plate of the touch screen arrangement of FIG. 1 showing active touch detection regions of the top plate.
Figure 7:
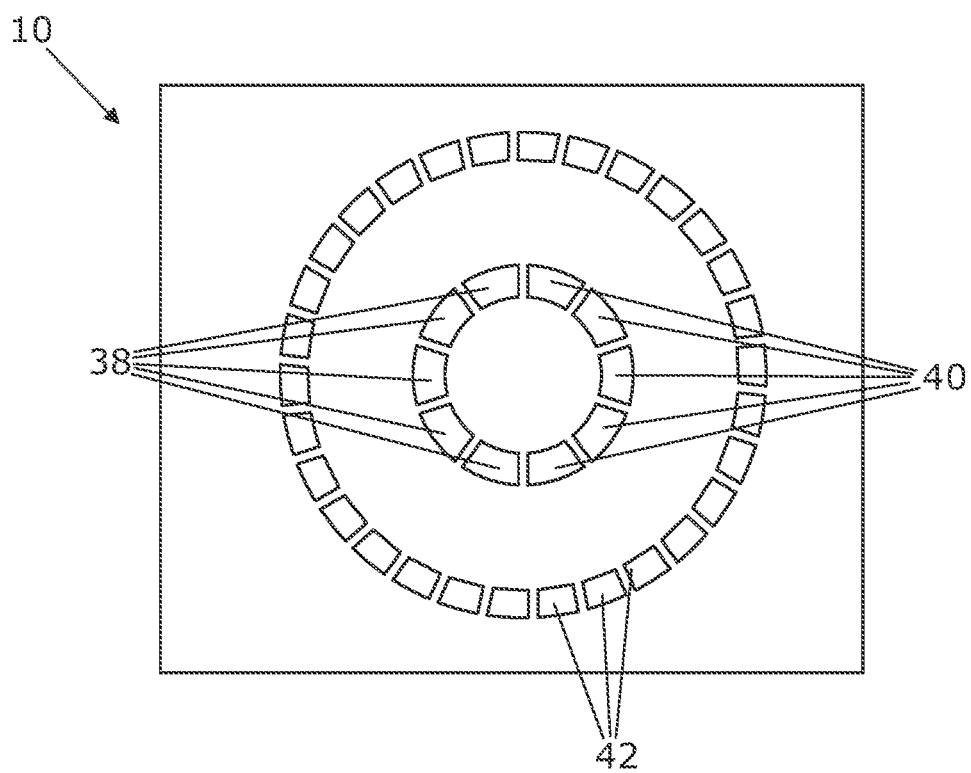
FIG. 7 is a plan view of the top plate of the touch screen arrangement of FIG. 1 showing display regions of the top plate.

The top plate 10 comprises multiple touch detection regions and multiple display regions. FIG. 6 shows these active touch detection regions, in planar view, from a vantage point looking directly down onto the upper surface 20 of the top plate 10, and FIG. 7 shows the display regions from the same perspective.

The touch detection regions define areas of the upper surface 20 of the top plate 10 in which a touch can be detected by the touch screen arrangement 8. In this way, the top plate 10 defines a multitouch surface, and the touch screen arrangement 8 is multitouch.

Each touch detection region has an associated sensor 14 positioned generally beneath it that enables the touch screen arrangement 8 to detect a touch in that region, as will be explained.

The top face 24 and the side face 26 of the top plate 10 each define multiple touch detection regions in this embodiment. Specifically, the top face 24 defines two central touch detection regions, i.e. a first central touch detection region 32 and a second central touch detection region 34, and the side face 26 defines thirty outer touch detection regions 36 that are spaced at equal intervals around the side face 26 (only three of which are labelled in FIG. 6 so as not to obscure the clarity of the figure). In this embodiment, the first and second central touch detection regions 32, 34 are each generally semi-circular in shape, together defining a generally circular region that substantially covers the top face 24. Each outer touch detection region 36 is generally rectangular in this embodiment.

In other embodiments, it would be possible for the top plate 10 to include more or fewer touch detection regions, and/or for the touch detection regions to take different shapes and/or to encompass different areas of the top plate 10, such that different or additional areas of the touch screen arrangement 8 may be provided with touch capability in other embodiments.

In some embodiments, some or all of the touch detection regions may be demarcated from surrounding regions of the top plate 10 and/or from each other by means of shallow ridges or grooves (not shown) provided at appropriate positions on or in the upper surface 20 of the top plate 10, so long as these features do not cause significant upward leakage of the light contained in the top plate by total internal reflection. Such features may assist in orienting the finger or stylus of a user and provide a guide for a user's finger or stylus, as well as providing a visual indication of the position of, and demarcation between, different touch detection regions.

The display regions define areas of the top plate 10 that may be illuminated in dependence on a touch in one or more of the touch detection regions. For this, each display region has an associated display light 16 positioned generally beneath it, as will be explained.

In this embodiment, each display region is associated with a touch detection region, and the touch screen arrangement 8 is configured to illuminate one or more specific display regions when a touch is detected in their associated touch detection region. Referring to FIG. 7 in particular, the display regions comprise ten central display regions, comprising five first central display regions 38 and five second central display regions 40, and thirty outer display regions 42 (only three of which have been labelled in FIG. 7 so as not to obscure the clarity of the figure).

The central display regions 38, 40 are provided on the top face 24 of the top plate 10, within the central touch detection regions 32, 34. In particular, the first central display regions 38 are provided within the first central touch detection region 32 and the second central display regions 40 are provided within the second central touch detection region 34. The first and second central display regions 38, 40 are each positioned towards the circumferential edge 28 of the top face 24.

The touch screen arrangement 8 is configured such that a touch in the first central touch detection region 32 causes one or more of the first central display regions 38 to be illuminated, as will be explained. Correspondingly, a touch in the second central touch detection region 34 causes one or more of the second central display regions 40 to be illuminated.

The outer display regions 42 are positioned radially outwardly from the outer detection regions 36, in the surrounding portion 30 of the top plate 10, so as to surround the side face 26 of the top plate 10. Each outer display region 42 is adjacent and radially aligned with an associated outer detection region 36. In this embodiment, as will be explained later, the touch screen arrangement 8 is configured such that a touch in an outer touch detection 36 region causes its associated outer display region 42 to be illuminated.

It should be noted that although each touch detection region and display region is associated with only a single detector and display light, respectively, in this embodiment, other embodiments could differ in this regard. For example, in other embodiments some or all of the touch detection regions could have two or more associated detectors. Furthermore, some or all of the display regions could have two or more associated display lights, or a pixel grid, so as to enable the display of more complex information in the form of, for example, words or symbols. In the embodiments shown, this may be implemented in the central display regions 38, 40 for example.

The arrangements in the edge region, between inner and outer display regions, and in the central region, will now be described in more detail. These involve sensors 14 and display lights 16 of the touch screen arrangement 8.

In this embodiment, each sensor 14 is a photodetector in the form of a proximity focused PIN diode, although the skilled person understands that other sensors are possible. Each sensor 14 is positioned generally beneath the top plate 10, and is arranged such that its active sensing area 43 is directed towards the lower surface 22 of the top plate 10 and is in close proximity to the lower surface 22 of the top plate 10 such that no additional focusing optics, other than those integral to the sensor, are required between the top plate 10 and the sensors 14 in this embodiment. In this way, each sensor 14 is configured to detect light transmitted out of the top plate 10 when a user touches the top plate 10 in an associated touch detection region that generally overlies the sensor 14.

The sensors 14 comprise a first central sensor 48 associated with the first central touch detection region 32, a second central sensor 50 associated with the second central touch detection region 34, and thirty outer sensors 52 each associated with a different outer touch detection region 36. It should be noted that more or fewer central and/or outer sensors could be used in other embodiments, and the invention is not limited in this regard.

The display lights 16 each comprise a light emitting diode (LED) operating in the visible spectrum in this example, although the skilled person appreciates that alternative light sources are possible.

In this embodiment, the display lights 16 comprise five first central display LEDs 54 each associated with the first central display region 38 and the first central touch detection region 32, five second central display LED 56 each associated with the second central display region 40 and the second central touch detection region 34, and thirty outer display LEDs 58 each associated with a different outer display region 42 and outer touch detection region 36. Each display light 16 is configured and controlled to illuminate its associated display region in dependence on a touch in its associated touch detection region.

The sensors 14 and display lights 16 are mounted on a printed circuit board (PCB) 60 and are housed in an inner housing 62 that is attached to the PCB 60 by means of bolts or screws.

The inner housing 62 is a 3D printed structure that is shaped in this embodiment such that at least a portion of an upper surface 64 of the structure generally matches and follows the contours of the top plate 10 that overlies it. The inner housing 62 includes a top face 66 that defines a central region and a side face 68 that defines a circumferential edge region. When the touch screen arrangement 8 is assembled, the top face 24 and the edge region 26 of the top plate 10 are generally aligned with the top face 66 and the edge region 68 of the inner housing 62, such that the top face 24 of the top plate 10 overlies the top face 66 of the inner housing 62 and the edge region 26 of the top plate 10 overlies the edge region 68 of the inner housing 62.

The inner housing 62 comprises a plurality of sensor openings that receive and house the sensors 14 in use and a plurality of display openings that house the display lights 16 in use.

The sensor openings comprise a first central sensor opening 70 for housing the first central sensor 48, a second central sensor opening 72 for housing the second central sensor 50, and thirty outer sensor openings 74 for housing the outer sensors 52.

Figure 4:
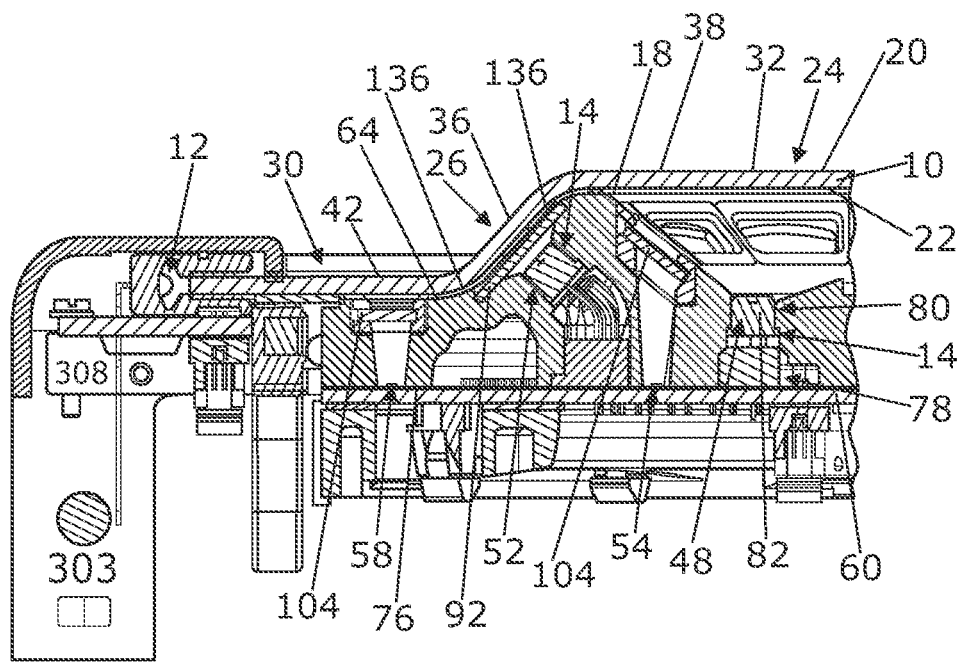
FIG. 4 is a schematic cross-sectional view of a part of the touch screen arrangement of FIG. 1.
Figure 5:
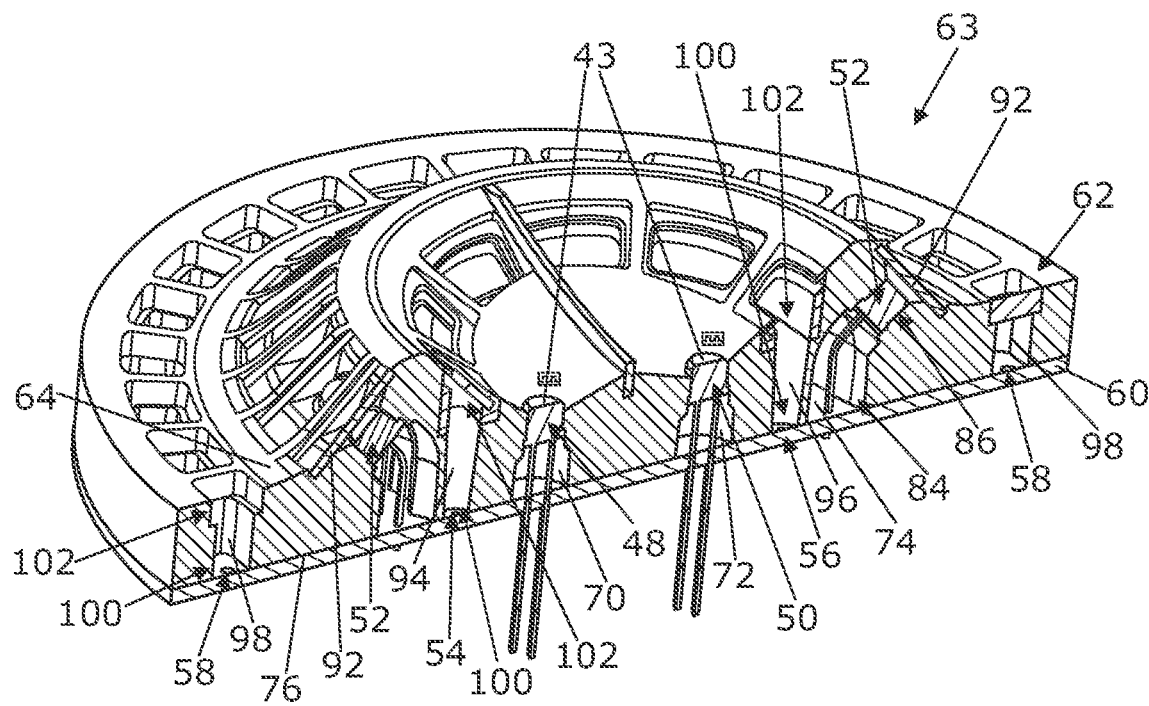
FIG. 5 shows a perspective cut-away view of a detection and display unit of the touch screen arrangement of FIG. 1.

The central sensor openings 70, 72 extend through the entire thickness of the inner housing 62 defined between the upper surface 64 and a lower surface 76 of the inner housing 62. Each central sensor opening 70, 72 extends generally upwardly from a lower end 78 at the lower surface 76 of the inner housing 62 to an upper end 80 at the upper surface 64 of the inner housing 62. The upper ends 80 of the central sensor openings 70, 72 are dimensioned to generally match the dimensions of the cap or head 82 of the central sensor to be housed in the opening 70, 72, so as to accommodate the head 82 in a relatively close fit as best seen in FIG. 4. The central sensor openings 70, 72 are positioned such that, when the touch screen arrangement 8 is assembled, the first central touch detection region 32 of the top plate 10 overlies the first central sensor opening 70 housing the first central sensor 48, and the second central touch detection region 34 of the top plate 10 overlies the second central sensor opening 72 housing the second central sensor 50.

The outer sensor openings 74 also each extend through the entire thickness of the inner housing 62 defined between its upper and lower surfaces 64, 76. Each outer sensor opening 74 extends from a lower end 84 at the lower surface 76 of the inner housing 62 to an upper end 86 at the upper surface 64 of the inner housing 62. Each outer sensor opening 74 includes a lower section 88 that extends upwardly from the lower end 84 and an upper section 90 that extends upwardly and radially outwardly from the lower section 88 to the upper end 86. The upper end 86 of each outer sensor opening 74 is dimensioned to generally match the dimensions of the package or head 82 of the outer sensors 52, so as to accommodate the head 82 in a relatively close fit. The outer sensor openings 74 are positioned such that each outer touch detection region 36 of the top plate 10 generally overlies an outer sensor opening 74 of the inner housing 62, and its associated outer sensor 52, when the touch screen arrangement 8 is assembled for use.

A sensor window 92 in the form of a generally planar plate is provided at the upper end 80, 86 of each sensor opening 70, 72, 74 and is supported in place by the inner housing structure. Each sensor window 92 sits between the top plate 10 and the sensor that is housed in the sensor opening 70, 72, 74 over which the window 92 is provided. The material and/or coatings of the sensor windows 92 are chosen to allow for transmission of light from the light sources 12 that illuminate the top plate 10, so that light exiting the top plate 10 owing to a touch on its upper surface 20 can reach and be detected by the sensors 48, 50, 52. For example, in one possible embodiment, the light sources 12 emit infrared light. The sensor windows 92 may then be substantially transparent at corresponding infrared wavelengths so as to allow infrared light exiting the top plate 10 owing to a touch to reach the sensors 48, 50, 52. In this case, the sensor windows 92 may advantageously have low transmissivity for visible light so as to be optically dark in the visible, such that the sensors 48, 50, 52 beneath the windows 92 cannot be seen in the assembled touchscreen arrangement 8. This not only enhances the aesthetic appeal of the touch screen arrangement 8, but also reduces the amount of visible light that reaches the sensors 48, 50, 52 to reduce the induced electrical Shot noise in the sensors and hence system.

The display openings comprise five first central display openings 94 each of which houses a first central display LED 54, five second central display openings 96 each of which houses a second central display LED 56, and thirty outer display openings 98 each of which houses an outer display LED 58.

Each display opening 94, 96, 98 extends through the full thickness of the inner housing 62, from a lower end 100 at the lower surface 76 of the inner housing 62 to an upper end 102 at the upper surface 64 of the inner housing 62. Each display opening 94, 96, 98 is provided with a display window 104 in the form of a generally planar plate that is supported at the upper end 102 of the display opening 94, 96, 98 by the inner housing structure. The material and/or coatings of the display windows 104 are chosen to allow the visible light from the display lights 16 to be transmitted through the display windows. The display windows 104 may advantageously have diffusing properties to enhance the aesthetics of the illumination of the display regions by their corresponding display lights 16.

The sensors 14, display lights 16, inner housing 62, sensor windows 92, display windows 104 and PCB 60 and associated electronics form a detection and display unit 63 of the touch screen arrangement 8. The detection and display unit 63 defines a generally circular profile in plan view.

In the assembled touch screen arrangement 8 of this embodiment, the top plate 10, the emitter unit 17, and the detection and display unit 63 are supported by a supporting structure 106.

The supporting structure 106 includes a main body 108, a base 110 and first and second side covers 112a, 112b.

The main body 108 includes a central section 114 for supporting the top plate 10 and for supporting and housing the detection and display unit 63, and a side section 116 for supporting and housing the emitter unit 17.

The central section 114 comprises plate supporting beams 118 and attachment extensions 120 that extend downwardly from the plate supporting beams 118 and are arranged to engage with attachment means 122 of the base 110. The side section 116 comprises emitter supporting platforms 123 that extend outwardly from the plate supporting beams 118.

The base 110 has a supporting section 124 that comprises an upper surface 126, a lower surface (not shown), and a circumferential surface 130. The supporting section 124 has a generally circular shape in plan view that substantially matches the shape and size of the detection unit 63 in plan view. The attachment means 122 extend from the circumferential surface 130 of the supporting section 124 of the base 110.

In the assembled touch screen arrangement 8, the top plate 10 sits on and is supported by the plate supporting beams 118 of the main body 108. The base 110 is attached to the main body 108 by means of bolts or screws that extend through openings 132 of the attachment extensions 120 of the main body 108 and into openings 134 of the attachment means 122 of the base 110. The detection and display unit 63 sits on and is supported by the base 110, such that the top plate 10 overlies this unit 63. Specifically, the touch detection regions of the top plate 10 overlie the sensors 14 of the unit 63 and the display regions of the top plate 10 overlie the display lights 16 of the unit 63.

The side covers 112a, 112b are provided at either side of the central section, adjacent the top plate 10, and are bolted or screwed to the main body 108. The first side cover 112a overlies the emitter unit 17 and hides the emitter unit 17 from view of the user. Each side cover 112a, 112b slightly overlies an edge region of the top plate 10 and is secured to the main body 108 by means of bolts or screws in order to hold the top plate 10 in place. Thus, in this embodiment the top plate 10 is held in place mechanically by means of a plastic frame that is bolted together, the plastic frame taking the form of the side covers 112a, 112b and the main body 108—other mechanical retention strategies could also be used as appropriate.

As best illustrated in FIG. 4, masking strips 136 are provided between the top plate 10 and the detection and display unit 63 to mask areas of the touch screen arrangement 8 where there is no touch sensitivity or display capability. The masking strips 136 are made of a material which does not "wet out" on contact with the top plate and hence causes negligible light loss from the top plate due to FTIR. The masking strips hide the presence of any electronics and support structures from the user. Although multiple distinct masking strips 136 are used in this embodiment, masking could be provided by a single-piece component that sits between the top plate 10 and the detection and display unit 63, and that includes openings that correspond to the positions of the sensor openings 70, 72, 74 and the display openings 94, 96, 98 of the inner housing 62.

Operation of the touch screen arrangement of FIGS. 1 to 11 will now be described.

When a user touches the upper surface 20 of the top plate 10 in a touch detection region, light is coupled downwardly out of the top plate 10, and onto one or more sensors 14 beneath the top plate 10. The location on which the top plate 10 is touched determines the underlying sensor or sensors 14 on which light from the top plate 10 is incident.

As discussed already, the area of actual surface contact between the user's finger or stylus and the top plate 10 during a touch determines the absolute amount of light that is released from the top plate 10 during the touch, and is thus related to the intensity of light that is captured by the corresponding sensor(s) 14 owing to a touch, and therefore to the change in light intensity detected by the corresponding sensor(s) 14 owing to a touch. The area of actual surface contact is dependent on the nominal area of contact between the user's finger or stylus and the top plate 10, and the pressure or intensity of the touch.

The change in light intensity detected by the sensor(s) 14 for a given touch is therefore indicative of the touch pressure and/or nominal extent of the touch. A harder, more forceful, touch results in greater actual surface contact between the user's finger and the top plate 10, and a bigger change in the intensity of light being detected by the underlying sensor 14 compared to a lighter toucher. A greater nominal area of contact between the user's finger and the top plate 10 also results in a bigger change in the intensity of light being detected by the underlying sensor(s) 14. Correspondingly, a lighter, less forceful, touch results in a comparatively smaller change in the intensity of light being detected by the underlying sensor 14 compared to a more forceful touch, as does a smaller area of contact between the user's finger or other touch device and the top plate 10 during a touch. There is also a significant difference between the intensity of light detected by the underlying sensor 14 for a given touch pressure/contact area when using, for example, a moist finger versus a dry finger.

Processing means (not shown) receive data from the sensors 14 representative of the intensity of light detected by each sensor 14. The processing means can determine which touch detection region or regions of the top plate 10 have been touched based on which sensor or sensors 14 detect a change in the intensity of light received from the top plate 10 at any given time. The processing means can also determine the touch pressure/extent of the touch in the touch detection region(s) based on the change in intensity of light incident on the sensors 14.

The display lights 16 can then be controlled based on the nature and position of the touch.

A touch in the first central touch detection region 32 causes activation of one or more of the first central display LEDs 54 and illumination of one or more of the first central display regions 38 in this embodiment. A touch in the second central touch detection region 34 causes activation of one or more of the second central display LEDs 56 and illumination of one or more of the second central display regions 40 in this embodiment.

When a user touches the top plate 10 in the first or second central touch detection region 32, 34, light is coupled downwardly out of the top plate 10. Depending on the position of the touch within the first or second central touch detection region 32, 34, light coupled downwardly out of the top plate 10 may be incident on the first central sensor 48 and/or the second central sensor 50.

The processing means (not shown) receive data from the central sensors 48, 50 representative of the intensity of light detected by each central sensor 48, 50, and an interpolation is used to determine whether the touch has occurred closer to the region of the top plate directly overlying the first central sensor 48 or to the region of the top plate directly overlying the second central sensor 50. In this way, the processing means can determine whether the touch has occurred in the first central touch detection region 32 or the second central touch detection region 34. The central display LEDs 54, 56 can then be controlled based on the position and nature of the touch accordingly.

Figure 8:
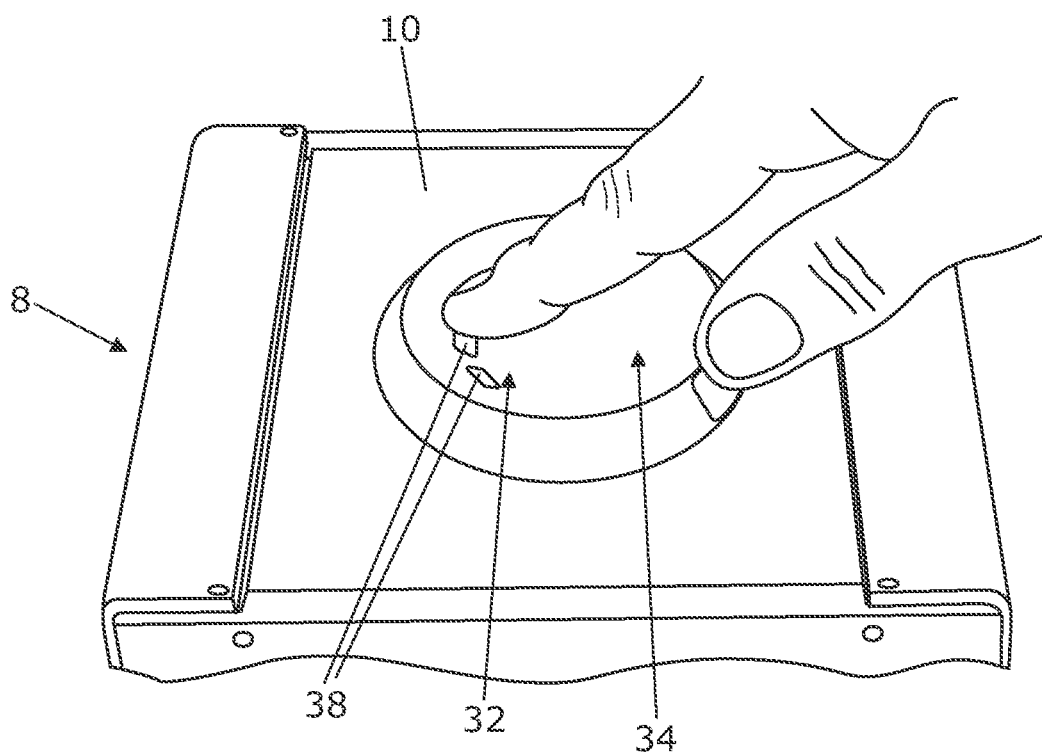
FIG. 8 shows a user touching a central touch detection region of the touch screen arrangement of FIG. 1.

Referring to FIG. 8, this shows a user touching the top plate 10 in the first central touch detection region 32 such that three first central display LEDs 54 (one of which is not visible in FIG. 8) are activated to illuminate their corresponding, overlying, first central display regions 38.

In this embodiment, the number of first display LEDs 54 that are activated for a given touch in the first central touch detection region 32, and the brightness of the activated LEDs 54, is dependent on the change in light intensity detected by the central sensors 48, 50 owing to the touch, and hence on the pressure and extent of the touch. Correspondingly, the number of second display LEDs 56 that are activated for a given touch in the second central touch detection region 34, and the brightness of the activated LEDs 56, is dependent on the change in light intensity detected by the central sensors 48, 50 owing to the touch, and hence on the pressure and extent of the touch.

In other embodiments, the manner in which the touch screen arrangement 8 responds to a touch in the central touch detection regions 32, 34 may differ.

Figure 9:
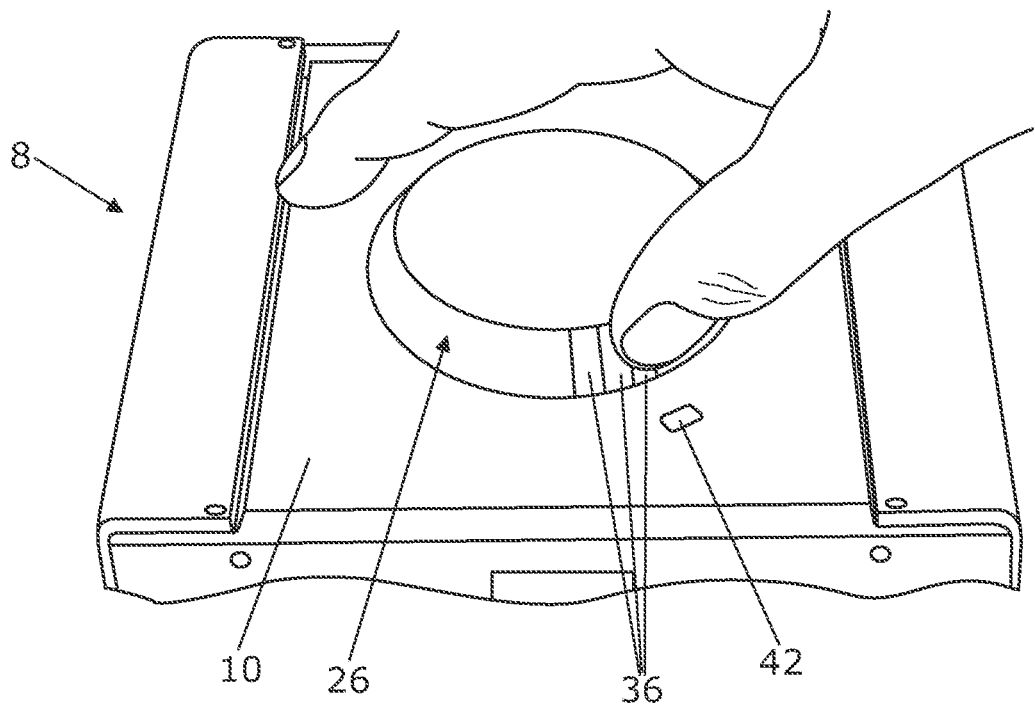
FIG. 9 shows a user touching the touch screen arrangement of FIG. 1 in a touch detection region to cause illumination in a corresponding display region.

Referring now to FIG. 9, a touch in an outer touch detection region 36 causes activation of an associated outer display LED 58, and hence illumination of a corresponding outer display region 42 that is positioned radially outwardly and adjacent the outer touch detection region 36 of the top plate 10 in this embodiment.

FIG. 9 shows a scenario in which a user is touching the upper surface 20 of the top plate 10 in a single outer touch detection region 36. The corresponding outer display LED 58 is activated thereby illuminating the corresponding outer display region 42 of the top plate 10 that overlies the outer display LED 58, and that is positioned radially outwardly and adjacent the outer touch detection region 36 that is touched by the user. The intensity of light output from the outer display LED 58 depends on the intensity of light from the top plate 10 that is incident on the corresponding outer sensor 52. In this way, a harder touch results in brighter illumination of the corresponding outer display region 42, as does a touch in which a greater area of the outer touch detection region 36 is contacted by, for example, the user's finger.

In the example of FIG. 9, the user's touch is confined to a single outer touch detection region 36, and illumination of the touch screen arrangement 8 is confined to a single outer display region 42.

Figure 10:
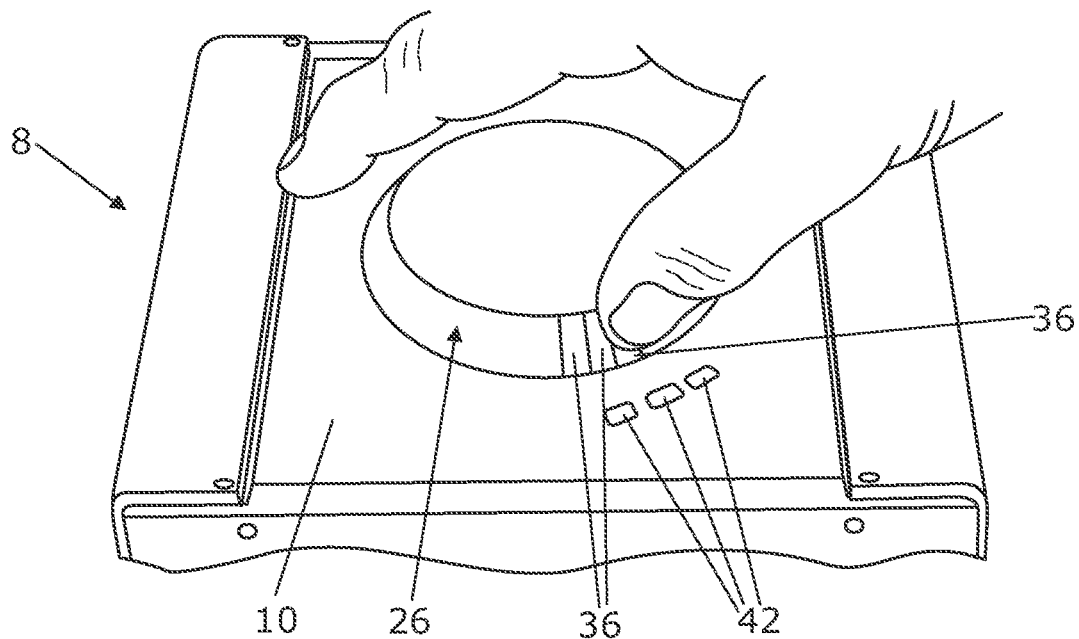
FIG. 10 shows a user touching the touch screen arrangement of FIG. 1 in three touch detection regions to cause illumination in three corresponding display regions.

In the example shown in FIG. 10, however, the user's finger contacts the top plate 10 in three neighbouring outer touch detection regions 36 simultaneously during the touch, and the three corresponding outer display regions 42 positioned radially outwardly and adjacent the three outer touch detection regions 36 are illuminated. As illustrated in FIG. 10, the touch screen arrangement 8 is configured in this embodiment such that the brightest illumination occurs in the outer display region 42 that corresponds with the outer touch detection region 36 experiencing the greatest level of contact with and pressure from the user's finger. The skilled person will appreciate, however, that it would be possible for the touch screen arrangement 8 to be configured in different ways. For example, the arrangement 8 could be configured such that an outer display LED 58, or any other display light 16, is only activated if the intensity of light detected by the corresponding sensor 14 meets or exceeds a predetermined threshold. In this way, the system can be configured to ignore light, accidental, touches, and/or to only illuminate a single display region corresponding to the primary region touched by a user. In that case, it would be possible for a single display region to illuminate as shown in FIG. 9 even in the event that, for example, a user's finger contacts three touch detection regions as in the example of FIG. 8. As another example, the arrangement 8 could be configured such that one or more of the outer display LEDs 58 are activated when a sensor 14 associated with a neighbouring display region detects that the intensity of light is above a certain predetermined threshold.

It will be appreciated that illumination of display regions of the top plate 10, and the type of information displayed by virtue of this illumination, will depend on the specific application of the screen arrangement 8. For example, alternatively or additionally to the above, a touch in a touch detection region may cause illumination in any other region of the screen arrangement 8 having display capability, and/or in multiple display regions of the arrangement 8.

It should also be appreciated that, in other embodiments, the touch screen arrangement 8 may be configured for different functionalities in addition or instead of the illumination described above. For example, the touch screen arrangement 8 may be configured such that different types of touch result in specific control functionality. In an embodiment in which the screen arrangement 8 is incorporated in a control screen for a speaker, for example, a touch in a certain region, and/or a certain type of touch, may result in a device setting being selected.

In addition to the screen arrangement 8 being configured to display information based on the position of one or more touches, as indicated already, the screen arrangement 8 may be configured such that information is displayed based on the nature of the touch. For example, a swiping action by a user may cause specific information to be displayed or a specific action to be taken, for example a specific device setting to be selected. For example, if a user swipes their finger across the top face of the top plate 10, such that the first and second central touch detection regions are touched consecutively, then this may trigger a specific action. The arrangement 8 may be configured to differentiate between a swipe of the finger that touches the first detection region followed by the second detection region, and one that touches the second detection region followed by the first detection region, with different functionalities potentially attributed to these different gestures.

The touch screen arrangement 8 may also allow for multiple, simultaneous or consecutive, touches in different touch detection regions to be detected and attributed with different control functionalities. For example, in some embodiments, the touch screen arrangement 8 may be configured such that simultaneous or consecutive touches in two or more predetermined touch detection regions cause illumination of one or more display regions.

Figure 11:
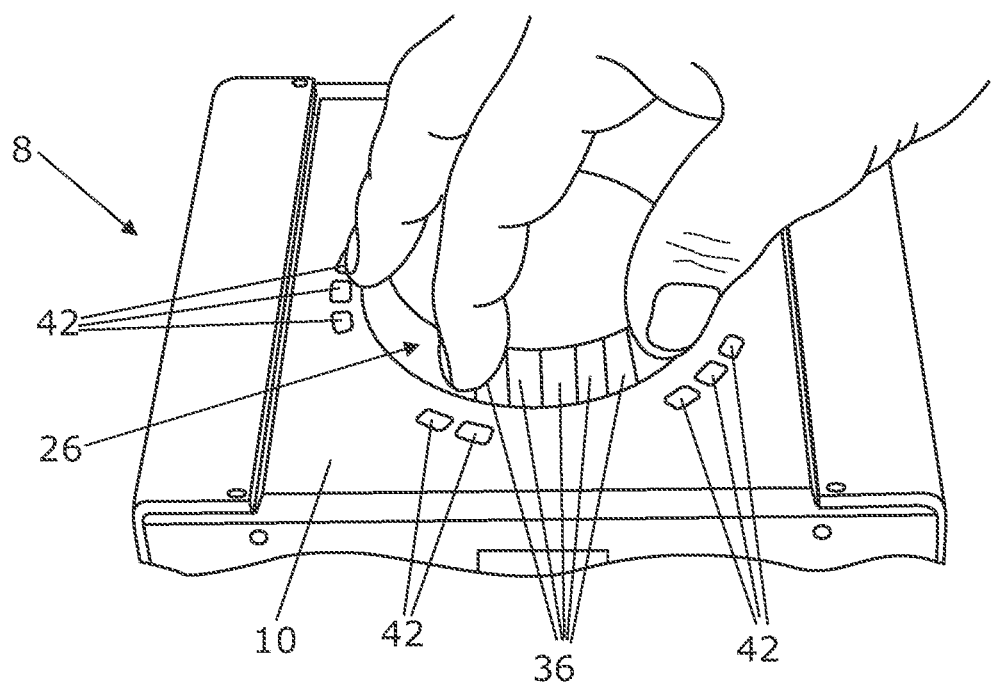
FIG. 11 shows the touch screen arrangement of FIG. 1 in use as a static touch-dial.

In some embodiments, the touch screen arrangement 8 may be configured for use as a 'static touch-dial'. Referring to FIG. 11 in particular, the arrangement 8 may be configured such that, when a user grasps the side face of the top plate 10 in a number of outer detection regions as shown in FIG. 11, and moves their fingers as if to rotate a rotatable dial, then a control functionality usually associated with rotation of a rotatable dial is carried out. The outer display regions associated with the outer touch detection regions touched by the user may also illuminate, as shown in FIG. 11. In that case, as the user moves their fingers across outer detection regions, illumination of the outer display regions also correspondingly moves with the moving touch detection regions. In an embodiment where, for example, the touch screen arrangement 8 is incorporated as part of a control panel for a speaker system, the arrangement 8 may be configured such that if a user grasps the side face in multiple touch detection regions and turns their hand as if rotating a moveable dial, the volume of a speaker is increased or decreased accordingly. As another example, a two-fingered tap in two outer detection regions may cause, for example, the speaker output to pause.

The skilled person will understand that the above is just a selection of the functionality that a screen arrangement 8 as shown in FIGS. 1 to 11 might have. Depending on the intended use of the screen arrangement 8, many other functionalities are possible.

The skilled person will also understand that many variants of the touch screen arrangement 8 described above are possible within the scope of the invention.

Figure 12:
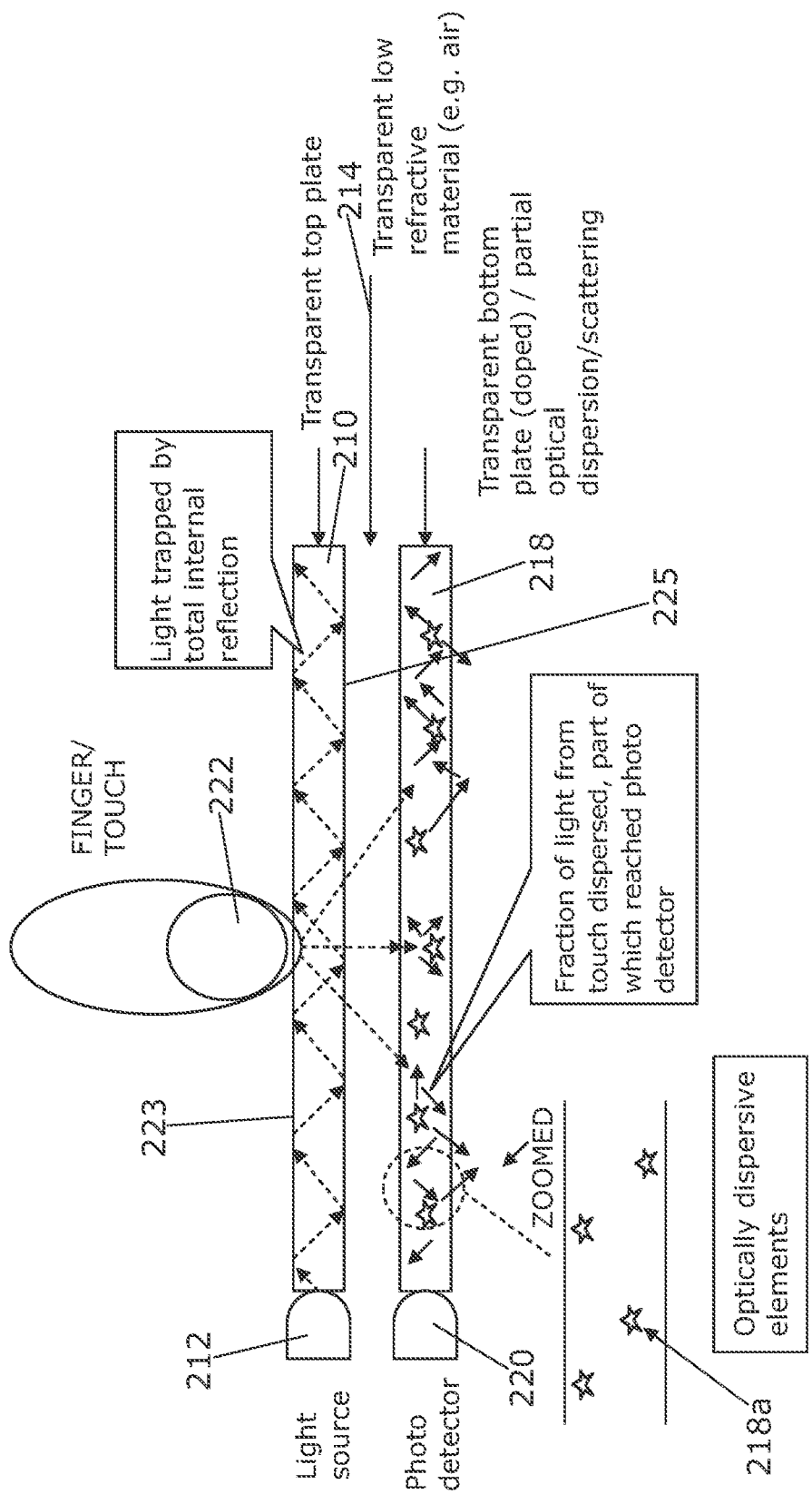
FIG. 12 is a schematic cross-sectional view of a touch sensitive system that utilises a lossy bottom plate.

For example, in some embodiments, the touch screen arrangement 8 may include one or more regions which utilise a functional system as described in WO 2015/155508, which is incorporated by reference herein to the extent permitted by law. FIG. 12 illustrates this functional system, which will now be described for completeness.

The system of FIG. 12 comprises an optically transparent top plate 210 and one or more light sources 212 located at an edge or multiple edges thereof. Located below the top plate 210, there is an optional middle layer 214 having a refractive index which is less than that of the optically transparent plate, and which in this example is comprised of air. The top plate 210 is illuminated by the light source(s) 212 so as to cause total internal reflection of the light within the top plate 210.

The system of FIG. 12 further comprises an optically dispersive and lossy bottom, or base, plate 218 and a sensor 220 in the form of a photo detector located at an edge thereof. The bottom plate 218 has a dispersive property which causes light incident thereon from above to be dispersed towards its edges, as well as being lost from the upper and lower surfaces of this plate, in such a manner as to form a dominantly lossy plate. Such dispersive property can be achieved in a number of different ways, as will be apparent to a person skilled in the art.

In the event that a pointer such as a stylus or finger 222 touches a first surface 223 the top plate 210, the total internal reflection within the top plate 210 is interrupted by means of frustrated total internal reflection (FIR). This causes some light 223 to be transmitted through the top plate 210 and the middle layer 214 to the bottom plate 218, such that light is coupled from a second surface 225 of the top plate 210 into the underlying base plate 218 for transmission within the base plate 218. The dispersive/lossy properties of the bottom plate 218 cause the light incident thereon from above to be dispersed and scattered in a lossy manner, as previously described, through the plate 218 toward the edges, such that part of said light is detected by the photo detector 220.

It will be appreciated that the location at which the top plate 210 is touched will determine the relative location on the bottom plate 218 at which light is incident and, therefore, the distance of said incident light from the edges of the bottom plate 218 (i.e. the distance over which light needs to travel to reach the photo detector edge). As a result, the relative amount of light detected by the photo detector 220 will be entirely dependent on the location at which the top plate 210 is touched and, therefore, the location on the bottom plate 218 at which light is incident. Furthermore, increased pressure from a pliable pointer, such as a finger 222, causes a greater area of contact and an increased degree of contact underneath the finger 222 thereby causing more of the totally internally reflected light to be interrupted, and hence increasing the intensity of the evanescent light emitted from the top plate 210. The absolute light intensity detected by the sensors 220 for a given touch position is therefore indicative of the touch intensity or pressure, such that a higher absolute intensity of light indicates a harder, more forceful, touch, and a lower intensity of light indicates a lighter, less forceful, touch to the top plate 210.

The scattering/dispersive property of the lossy bottom plate 218 may be used to control the behaviour of the attenuation of the captured light with distance from the originating touch, so that the location of the touch point can be uniquely calculated, and accuracy of the position of touch controlled. The profile of the attenuated captured light with distance may also be controlled, by controlling the profile of the concentration of scattering/dispersive material 218a embedded in the bottom plate 218.

Processing means (not shown) are provided for receiving data from the photo detector(s) 220, representative of the amount and intensity of light detected thereby, such that the location of the touch point on the top plate 10 and the nature and/or shape of the touch can be calculated. By comparing the relative intensity at each photodiode 220, and their relative locations, as well as by using knowledge of the dispersive and attenuative properties of the bottom plate 218, it is possible to calculate the position and nature of a touch or even multiple touches. A device driver (not shown) will then be able to interpret the resultant data as a touch-based input.

Figure 13:
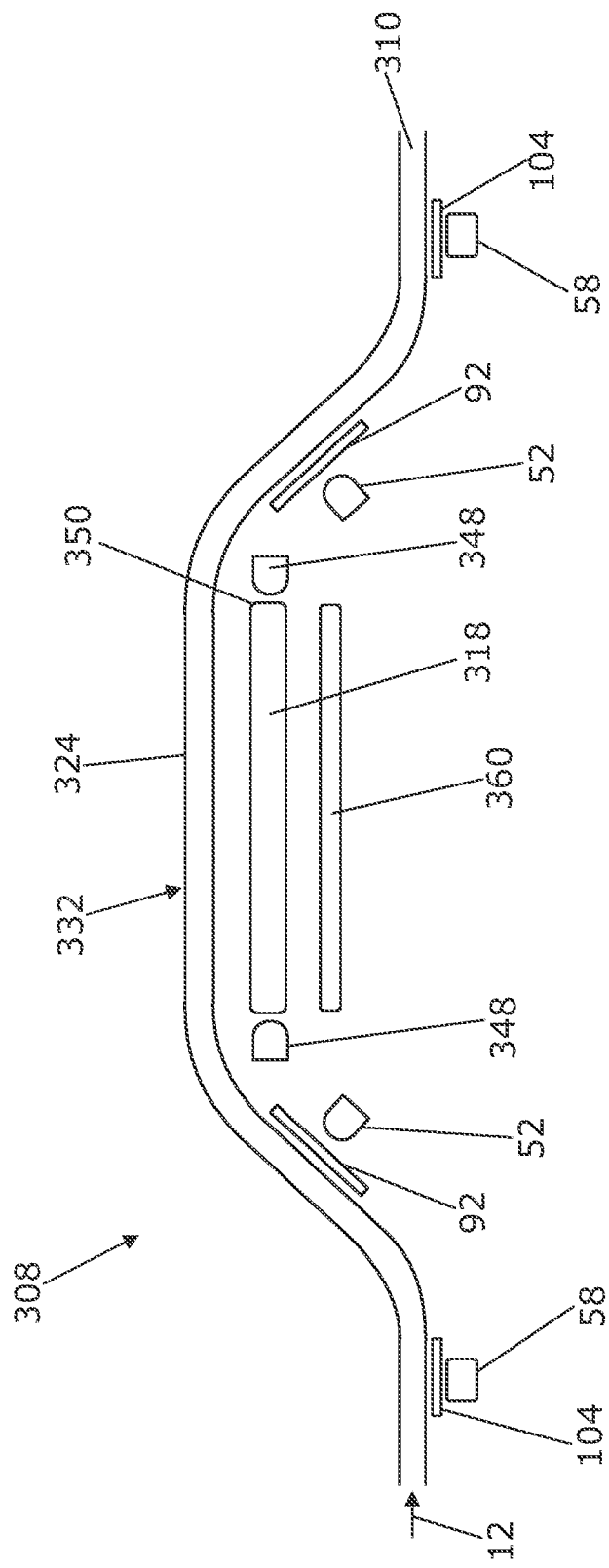
FIG. 13 is a schematic cross-sectional view of a touch screen arrangement in accordance with another embodiment of the invention.

Turning now to FIG. 13, this illustrates a touch screen arrangement 308 incorporating a functional system that utilises a lossy bottom plate 318 as that described in FIG. 12. Many aspects of the touch screen arrangement 308 of FIG. 13 are the same as the embodiment of FIGS. 1 to 11. Like features will be attributed like reference numerals and, for conciseness, like features will not be described again here. Where this embodiment differs from that of FIGS. 1 to 11 is that touch sensitivity of the central region of the top plate 310 is provided using a functional system as described in relation to FIG. 12, rather than using central sensors directed towards the lower surface of the top plate 310 as is the case in the embodiment of FIGS. 1 to 11.

In the touch screen arrangement 308 of FIG. 13, the top face 324 of the top plate 310 defines a central touch detection region 332. The lossy bottom plate 318 is arranged beneath the central touch detection region 332 of the top plate 310, to lie underneath the central touch detection region 332, such that the central touch detection region 332 overlies the bottom plate 318. In this way, the bottom plate 318 is configured to capture light transmitted out of the central touch detection region 332 when a user touches the top plate 310 in the central touch detection region 332. At least one central sensor 348 for detecting light exiting the bottom plate 318 is positioned at an edge 350 of the bottom plate 318. In this embodiment, eight central sensors 348 are spaced at equal intervals around the edge 350 of the bottom plate 318, and face inwardly towards the centre of the bottom plate 318. A display screen 360 is arranged beneath the top face 324 of the top plate 310, such that the bottom plate 318 sits between the top plate 310 and the display screen 360.

When a user touches the top plate 310 in the central detection region 332, light is transmitted out of the top plate 310 and into the bottom plate 318 below. The location at which the top plate 310 is touched, and the nature of the touch, can be determined in the same manner as already described in relation to FIG. 12 using associated processing means (not shown).

FIG. 13 illustrates one possible embodiment in which a touch screen arrangement according to the invention incorporates a functional system using a lossy bottom plate to provide touch sensitivity in a region of the touch screen arrangement. The skilled person will understand that, in other embodiments, the position and/or extent of the touch sensitive regions utilising the lossy bottom plate and/or sensors directed towards the lower surface of the top plate may vary.

The invention claimed is:

1. A touch sensitive apparatus comprising:
a top plate comprising a plurality of touch detection regions, and having one or more light sources associated therewith, such that light from the one or more light sources is transmitted within the top plate with total internal reflection;
one or more projecting regions that are elevated from the top plate, wherein at least one of the projecting regions comprises a central region and a circumferential edge region located between the central region and a region of the top plate, wherein the central region defines at least one touch detection region and the circumferential edge region defines a plurality of touch detection regions;
a plurality of detectors for detecting light from the one or more light sources, wherein each detector is associated with a touch detection region;
wherein the top plate and the detectors are arranged such that, if an external body touches a first surface of the top plate in a touch detection region, then light is coupled from a second surface of the top plate to the associated detector(s), wherein a sensing area of each detector associated with a touch detection region of the circumferential edge region is directed generally towards the second surface of the top plate;
the touch sensitive apparatus further comprising processing means to determine at least the presence or absence of a touch in any of the touch detection regions of the top plate.

2. The touch sensitive apparatus of claim 1, wherein the detectors are arranged beneath the top plate and are configured to detect light coupled out of the second surface of the top plate owing to a touch on the first surface of the top plate.

3. The touch sensitive apparatus of claim 1, wherein a sensing area of each detector is directed generally towards the second surface of the top plate.

4. The touch sensitive apparatus of claim 3, wherein each detector is a proximity focused PIN diode.

5. The touch sensitive apparatus of claim 1, wherein each light source is an infrared light source, and wherein each detector is an infrared detector, wherein a sensor window is disposed between each sensor and the top plate, and wherein the sensor window is substantially translucent to infrared light but substantially opaque to infrared light.

6. The touch sensitive apparatus of claim 5, wherein the at least one display element is positioned beneath its associated touch detection region, such that activation of the display element causes information to be displayed in its associated touch detection region.

7. The touch sensitive apparatus of claim 1, comprising at least one display element associated with a touch detection region and wherein the at least one display element is arranged beneath the top plate.

8. The touch sensitive apparatus of claim 7, wherein the at least one display element is positioned such that activation of the display element causes information to be displayed in a display region of the top plate that is adjacent the associated touch detection region of the display element.

9. The touch sensitive apparatus of claim 7, wherein the detectors and the display elements are housed together in a first housing unit, wherein the light sources are housed together in a second housing unit and wherein the second housing unit is positioned such that the light sources emit light into an edge of the top plate.

10. The touch sensitive apparatus of claim 1, wherein the processing means provides the touch detection regions of the circumferential edge region with the functionality of a dial.

11. The touch sensitive apparatus of claim 1, wherein the top plate is not planar.

12. The touch sensitive apparatus of claim 1, wherein the processing means determines a difference between the intensity of light detected by a first detector and the intensity of light detected by a second detector, and determines if a touch has occurred in a first touch detection region associated with the first detector or in a second touch detection region associated with the second detector based on the difference.

13. The touch sensitive apparatus of claim 1, wherein the processing means is adapted to detect touches in multiple touch detection regions at the same time.

14. A touch sensitive apparatus as claimed in claim 1, wherein the touch sensitive apparatus further comprises a further touch sensitive region, the further touch sensitive region comprising:
   a portion of the top plate discrete from the plurality of touch sensitive regions, wherein the one or more light sources transmit light within the portion of the top plate with total internal reflection; and
   an optically dispersive base plate, configured for transmission of light from the portion of the top plate onto and into said base plate in response to an external body touching said portion of the top plate at a touch point such that a location of incident light on the surface of said base plate is representative of a relative position of said touch point on said portion of the top plate, wherein said base plate is configured to capture and transmit within the base plate light incident thereon and disperse said transmitted light by spreading and energy loss, an optically dispersive characteristic of said base plate being such that a decrease in intensity of said transmitted light with distance from said location of incidence on said base plate surface approximates an exponential function, the arrangement further comprising at least one sensor for detecting an intensity of light transmitted out of the base plate at a respective edge of said base plate;
   wherein the processing means is adapted to calculate a relative position of said touch point on said screen from said detected light intensity and said exponential function.

15. A method of operating a touch sensitive apparatus comprising a top plate comprising a plurality of touch detection regions, and having one or more light sources associated therewith, such that light from the one or more light sources is transmitted within the top plate with total internal reflection, and a plurality of detectors for detecting light from the one or more light sources, wherein each detector is associated with a touch detection region; the touch sensitive apparatus further comprising one or more projecting regions that are elevated from the top plate, wherein at least one of the projecting regions comprises a central region and a circumferential edge region located between the central region and a planar region of the top plate, wherein the central region defines at least one touch detection region and the circumferential edge region defines a plurality of touch detection regions; wherein a sensing area of each detector associated with a touch detection region of the circumferential edge region is directed generally towards a second surface of the top plate from which light is coupled to the detector in response to a touch by an external body on a first surface of the top plate in a touch region of the circumferential edge region; wherein the touch sensitive apparatus further comprising processing means for determining at least the presence or absence of a touch in any of the touch detection regions of the top plate, the method comprising:
   determining in which touch detection regions of the touch sensitive apparatus a touch has been detected; and
   determining a control operation corresponding to the touch detection regions in which a touch has been detected and performing the control operation.

16. The method of claim 15, wherein touches are detected in multiple touch detection regions and control operations are performed corresponding to all of the touches.

17. The method of claim 16, wherein at least one control operation relates to multiple touch detection regions with touches detected at the same time.

* * * * *